July 26, 1932.   A. F. CONNERY   1,868,695
MEANS FOR INDICATING AND APPLYING ORIENTATION
CORRECTION TO TELEGRAPH DISTRIBUTORS
Filed July 11, 1930
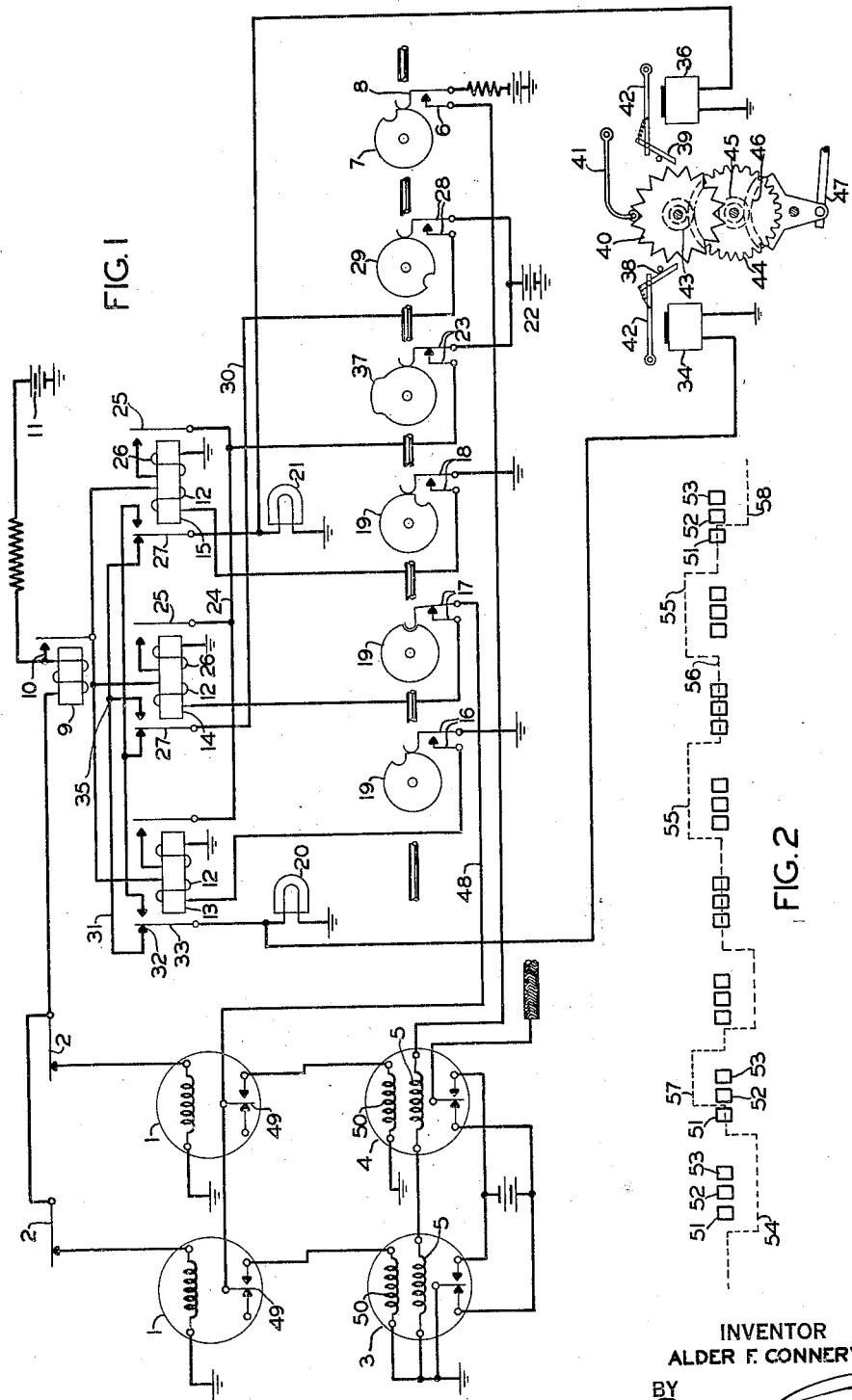
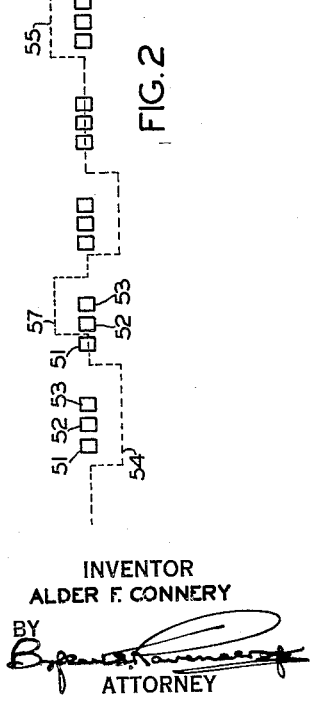
INVENTOR
ALDER F. CONNERY
BY
ATTORNEY Patented July 26, 1932

1,868,695

UNITED STATES PATENT OFFICE

ALDER F. CONNERY, OF BROOKLYN, NEW YORK, ASSIGNOR TO INTERNATIONAL COMMUNICATIONS LABORATORIES, INC., OF NEW YORK, N. Y., A CORPORATION OF NEW YORK

MEANS FOR INDICATING AND APPLYING ORIENTATION CORRECTION TO TELEGRAPH DISTRIBUTORS

Application filed July 11, 1930. Serial No. 467,247.

This invention relates to regenerative repeaters for telegraph systems, and has particular reference to means for indicating and applying orientation correction to distributors, such as may be used for re-shaping the signals. It is particularly applicable to cable transmission, although it has possible uses in other departments of the telegraph art.

It is well known that in the reception of cable telegraph signals, particularly over long lines, considerable deterioration in the wave form of the signal occurs. Regenerative repeaters are used with synchronizing devices for the purpose of re-shaping these waves. In order that the received signal may thus be most accurately regenerated, it is necessary that the distributor "pick-up" points be kept well centered with respect to the peak of each wave or impulse.

This invention provides means for indicating clearly when the pick-up point should be altered, and in which direction it should be moved. The indication is made before the actual errors are passed on by the repeater, and in most cases it is possible to apply correction before the errors are made.

In carrying out this invention, two things are accomplished: the occasional departure of a signal from the pick-up point to which it belongs is indicated by the flashing of one or another of two lamps, each lamp indicating the direction of departure of the signal from its proper position. Secondly, automatic means are provided for orienting the distributor so as to include the maximum number of signals within their proper pick-up points. This correction is applied through a gearing which so reduces the extent of the movement of the pick-up point that the effect of one unit signal departing from its proper position is very slight and only when such departure becomes repeated one way or the other does the orientation device on the distributor have much effect. If the reason for the loss of operating margin is signal deterioration and not the location of the pick-up point, then there will be an equal number of corrective impulses applied in opposite directions so that the pick-up point will not be altered.

A fuller understanding of this invention will now be had upon reference to the drawing in which:

Figure 1 shows the usual circuits for a regenerative repeater with its relays, and in addition a diagrammatic representation of the distributor, the cams of which appear in association with an arrangement of relays and orientation correcting mechanism forming the essence of the present invention.

Fig. 2 illustrates graphically the manner in which distorted signals may fail to overlap the proper pick-up points and where orientation correction is applied.

Referring to Fig. 1, the relay armatures 2 of the usual receiving relays responsive to cable signals are shown. One is for dot signals and the other for dash signals. They operate respectively the local relays 1 and these in turn, operate the repeating relays 3 and 4 which are provided for the purpose of reshaping the signals. The biasing windings 5 are connected with a contact 6 associated with the distributor whose cam 7 operates a contact 8 to open and close the biasing circuit repeatedly in accordance with the synchronism of the distributor. This arrangement is not novel, but is merely shown for the purpose of indicating the essential features of a regenerative repeater to which the present invention applies. It should be understood that the regenerative repeater is equipped with the usual means for maintaining the distributor in synchronism and approximate phase relation with the received signals.

According to the present invention the relay 9 is introduced in the battery circuit for the operating windings of the relays 1. The armature of relay 9 when pulled up against its front contact 10 feeds current from the battery 11 to any or all of the operating windings 12 of the three relays 13, 14 and 15 respectively. These relays are operated successively in accordance with the make and break contacts 16, 17 and 18, the latter being controlled by individual cams 19 on the distributor. Thus, current is supplied to the windings 12 only when the received signal over-laps the proper pick-up point. The signal should overlap all three pick-up points so as to operate the relays 13, 14 and 15, and if the signal deteriorates so that it only over-laps two of these pick-up points, failure of one of these relays to operate will set in motion the corrective means. It will also light one of the lamps 20 or 21, the function of which will be explained later.

Assuming that when contacts 16 are closed together, no signal is coming in over the line to actuate relay 9, then relay 13 will not be actuated. Assume further that the signal, delayed in its reception, now energizes relay 9 while contacts 17 and 18 are closed successively. Relays 14 and 15 will then be energized and will be locked by circuits which may be traced from battery 22 through contacts 23, conductor 24, relay armatures 25 and relay windings 26 to ground. The armatures 27 of relays 14 and 15 will also be pulled up. Next the distributor rotates until contacts 28 are closed by the cam 29. A circuit is thus established which may be traced from battery 22 through contacts 28, conductor 30, armature 27 of relay 14, conductor 31, back contact 32, armature 33 of relay 13 to the lamp 20 which is grounded, and also to the corrector magnet 34 which is grounded. The operation of relay 15 would in this case make it impossible for the last described circuit to divide at the point 35, and thus the lamp 21 would not be lighted, neither would the magnet 36 be energized.

Indication having been made by lamp 20 and correction having been applied by the magnet 34 as will be further explained, the distributor then reaches a position in which cam 37 operates to break the locking circuit for relays 13, 14 and 15, the circuit being open at the breaking of contacts 23.

It is obvious that if the signal were to come in and terminate too soon, relay 15 would not be actuated and hence the indicating lamp 21 would be lighted while magnet 36 would be operated to apply correction in the opposite direction.

The correcting mechanism consists of the previously mentioned magnets 34 and 36, the armatures of which actuate the pawls 38 and 39 respectively, these pawls being disposed so as to rotate the ratchet wheel 40 in either direction as may be desired. The detent 41 holds the ratchet wheel in any position to which it may be set. The armatures 42 drive the ratchet wheel by a step-by-step motion which is communicated through the gears 43, 44, 45 and 46 to a correcting lever 47, the latter connecting in any suitable manner with the orienting motion on the distributor. It will thus be seen that the pick-up point can be altered in either direction according as the signals may fail to come in in accordance with the synchronism of the distributor.

Since the proper pick-up point for each signal coincides with the closing of contacts 17 on the distributor, the circuit which includes these contacts and which operates relay 14 may also be employed for the purpose of actuating the repeating relays 3 and 4. This will be evident on tracing the circuit from battery 11 through contact 10, winding 12 of relay 14, contacts 17, conductor 48, one of the armatures 49 and one of the relay windings 50 to ground. It will thus be seen that the repeating relay 3 or 4 is actuated by the coincidence of operation of the receiving relay 1 with the reaching of the central pick-up point at which time contacts 17 are closed. The regenerated signals are therefore sent out with regularity in spite of any slight distortion of the incoming signals.

Referring to Fig. 2 the three pick-up points corresponding with the successive closing of contacts 16, 17 and 18 are indicated as at 51, 52 and 53. These pick-up points are sufficiently close together so that the received signal would normally over-lap all three. Such over-lapping is indicated by the negative signals 54, positive signals 55 and the space signals of zero potential 56. The distortion is represented as at 57 where the signal reception is so delayed that the receiving relay did not operate on the pick-up point 51 although it did operate on pick-up points 52 and 53. The failure of the signal to be received on pick-up point 51 would thus cause the lamp 20 to flash and the correcting magnet 34 would provide one step for the ratchet 40.

Correction would similarly be applied under the conditions shown as at 58 where a negative pulse was so delayed that it did not over-lap all three pick-up points 51, 52 and 53. Correction would in this case be applied in the same direction as before, since it is obvious that the operation of the distributor had a tendency to anticipate the signal reception.

It will be understood that this invention applies equally well to regenerative repeaters comprising that type of distributor which employs a brush rotating against a face plate made up of distributor segments.

Under certain conditions it may be considered desirable to dispense with the automatic correction in which cases magnets 34 and 36 together with associated apparatus may be dispensed with. Improper orientation will be indicated by flashes on lamps 20 or 21 and the orientation may then be altered manually.

What is claimed is:

1. In a correcting device for telegraph distributors, three successively operable self locking relays, distributor contacts individually connected with said relays for timing their operation, and means for applying phase-correction with respect to a received signal when the latter over-laps less than three of said distributor contacts.

2. In a correcting device for telegraph distributors, signal-receptive relays, re-transmitting relays, a distributor-controlled circuit for said re-transmitting relays to re-shape the repeated signals, a plurality of distributor controlled pick-up points normally included within the range of a received signal unit, and relay means to apply correction to the distributor when the signal unit fails to cover said plurality of pick-up points.

3. In a correcting device for telegraph distrbiutors a relay operative at the normal mid-point of an incoming signal, a second relay operative prior to the first said relay, a third relay operative subsequent to the first said relay, locking means for said relays, and phase-correcting means rendered operative by the failure of the incoming signal to actuate all of said relays.

4. The invention set forth in claim 3 in which lamps are provided to indicate the direction in which phase-correction is to be applied.

5. In a telegraph repeater comprising a distributor-controlled regenerative device, three signal-receptive contacts, three relays each of which connects respectively with one of said contacts and means to apply phase-correction through said relays when an input signal is picked up by fewer than the three of said contacts.

6. A phase-correcting device for telegraph distributors comprising a relay, a group of three other relays, parallel connections between a contact of the first said relay and the operating windings of the three other relays, a timing device to operate the last three relays successively during the pick-up of a signal and phase-correcting gearing rendered operative in alternative directions according to the particular end relay of said three other relays which fails to be included in the signal pick-up.

7. A phase-correcting device for telegraph distributors comprising distributor-actuated contacts successively closable during the interval of reception of a unit signal, correcting relays the windings of which connect individually with said contacts, a signal-responsive relay through the contacts of which potential is supplied to said correcting relays, locking means for said correcting relays, a distributor-actuated circuit breaker for said locking means, indicating lamps and magnetically operated phase-correcting mechanism individually associated with two of said correcting relays, and means to apply correction when one of said two relays fails to be actuated within the interval of reception of a unit signal.

8. In a phase-correcting device for distributor-controlled telegraph regenerators, three pick-up points on said distributor normally comprehended within the range of reception of a unit signal and means to indicate and apply correction when said signal fails to cover said three pick-up points.

9. The invention set forth in claim 8 in which the directional effect of the applied correction is determined by the particular pick-up point not covered by the signal.

10. The invention set forth in claim 8 in which regeneration of the signals is initiated by the middle one of the said three pick-up points.

11. The invention set forth in claim 8 in which a self-locking relay is associated with each pickup point and an unlocking device is provided and caused to be suitably actuated by the distributor after reception of each unit signal.

12. In an orientation indicator for telegraph distributors, three successively operable self-locking relays, distributor contacts individually connected with said relays for timing their operation and indicating means controlled by said self-locking relays to show the direction of departure of the received signals from the normal pick-up points.

13. In an orientation indicator for telegraph distributors, signal-receptive relays, re-transmitting relays, a distributor controlled circuit for said re-transmitting relays to re-shape the repeated signals and a relay-controlled means adapted to indicate distortion of the incoming signals and the direction of departure of the distributor from its proper orientation.

14. In a phase-correcting device for distributor-controlled telegraph regenerators, signal receiving means, a distributor, a plurality of pick-up points on said distributor normally included within the range of a received signal unit, and co-operating means controlled by signal distortion to apply the necessary correction.

In witness whereof I hereunto subscribe my name this 9th day of July, 1930.

ALDER F. CONNERY.